Re. 24890

United States Patent Office 2,733,132
Patented Jan. 31, 1956

2,733,132

PROCESS FOR THE PRODUCTION OF EPSOMITE FROM LANGBEINITE

William E. Burke, Carson City, Nev., assignor to International Minerals & Chemical Corporation, a corporation of New York No Drawing. Application January 31, 1952, Serial No. 269,351

12 Claims. (Cl. 23—128)

The instant invention relates to a process for the production of magnesium compounds. More particularly, the instant invention relates to a process for the production of magnesium sulfate from langbeinite.

Magnesium sulfate has been prepared in the past by evaporation from mineral waters and salt springs and as a by-product from the evaporation of sea water. It has also been obtained by the treatment of magnesite or of dolomite with sulfuric acid. One of the disadvantages of the latter processes is that a large quantity of sulfuric acid is consumed in converting the calcium carbonate into the sulfate. The use of substantial quantities of sulfuric acid is a disadvantage in a commercial process.

It is an object of the instant invention to provide an improved process for the production of magnesium compounds.

It is a further object of the instant invention to provide an improved process for the production of magnesium sulfate.

It is a further object of the instant invention to provide a process for the production of magnesium sulfate from langbeinite.

It is a further object of the instant invention to provide a process for the production of magnesium sulfate, magnesium oxide, and sulfuric acid from langbeinite.

These and other objects of the instant invention will become more apparent upon a fuller understanding of the instant novel process as herein set forth.

It has been discovered that magnesium sulfate is prepared from langbeinite-containing compositions. Langbeinite has the formula $K_2SO_4 \cdot 2MgSO_4$.

In initiating the instant novel process, sufficient langbeinite is mixed with water or an aqueous solution containing magnesium sulfate at a temperature below about 61° C. to cause the resulting solution to approach saturation with respect to magnesium sulfate hexahydrate. In this leonite formation step 61° C. is the maximum temperature to be employed because at higher temperatures langbeinite is stable and thus will not react. Although temperatures lower than about 50° C. may be used, they are preferably avoided because of reduced crystal yields in the crystallization step.

In carrying out the process continuously, a mother liquor containing magnesium sulfate produced in a subsequent step of the process can be recycled to this langbeinite treatment step. The resulting mixture which is substantially saturated with respect to magnesium sulfate hexahydrate is maintained at a temperature between about 50° C. and about 61° C., and leonite crystallizes from the mixture and is separated, for example by filtration, from the solution containing magnesium sulfate hexahydrate. The magnesium sulfate solution is cooled to a temperature below about 40° C., but above the freezing point of the solution. Epsomite ($MgSO_4 \cdot 7H_2O$) crystallizes from the cooled solution and is separated from the magnesium sulfate solution which is recycled to the initial langbeinite treatment step.

The epsomite which is separated from the solution is dehydrated by heating to obtain kieserite. If desired, the kieserite can be decomposed to produce magnesium oxide and sulfur trioxide which can be absorbed in water or dilute aqueous sulfuric acid to produce sulfuric acid or more concentrated sulfuric acid. The decomposition of kieserite to produce magnesium oxide and sulfur trioxide and the production of sulfuric acid from the sulfur trioxide can be carried out by any conventional method.

In a specific embodiment of the instant novel process, comminuted langbeinite which preferably has a mesh size smaller than about 200 is mixed with water or an aqueous magnesium sulfate solution, preferably the solution from a subsequent step of the process which is substantially saturated with respect to magnesium sulfate heptahydrate at a temperature between about 20° C. and about 40° C. The resulting mixture is heated at a temperature between about 50° C. and about 61° C. at atmospheric pressure for at least about 6 hours. After a period of about 6 hours substantially all of the langbeinite has reacted. The leonite which is formed in this step is separated from the enriched magnesium sulfate solution which is near saturation with respect to the magnesium sulfate hexahydrate. The leonite produced can be subjected to a base exchange process to produce potassium sulfate, or it can be sold for use as a fertilizer material.

The magnesium sulfate solution from which the leonite has been separated is cooled below about 40° C., but above the freezing point of the solution and preferably to a temperature between about 20° C. and 35° C. to crystallize epsomite. Epsomite is separated from the liquor in any convenient manner, for example by filtration or by centrifuging. The liquor from which the epsomite has been separated is substantially saturated with respect to magnesium sulfate heptahydrate and is recycled to the langbeinite treatment step. The epsomite is dehydrated, for example by heating at a temperature between about 150° C. and about 250° C. in a kiln drier. Kieserite is recovered from the drier and can be decomposed by heating at a temperature between about 900° C. and about 1200° C. to obtain magnesium oxide and sulfur trioxide.

In a preferred embodiment of the instant novel process, between about 20 and about 24 pounds of langbeinite comminuted to substantially 100% minus 200 mesh, is allowed to react with about 100 pounds of an aqueous solution containing about 27% magnesium sulfate at 30° C. The resulting mixture is heated for about 6 hours at a temperature between about 50° C. and about 61° C. Leonite crystallizes from the liquor and is separated by filtration. The magnesium sulfate remains in solution until the solution becomes saturated with respect to magnesium sulfate hexahydrate. The quantity of langbeinite added to the water or to the aqueous magnesium sulfate solution employed must be sufficient to substantially saturate the resulting mixture with magnesium sulfate hexahydrate salt. Therefore, the quantity of langbeinite employed depends upon the amount of magnesium sulfate in the solution if any. When langbeinite is treated with water, more langbeinite is required to saturate the resulting solution with magnesium sulfate hexahydrate than when a saturated solution of magnesium sulfate is employed as in the preferred practice of the process. If excess langbeinite is added, hexahydrate salt crystallizes and reduces the efficiency of the process.

The magnesium sulfate liquor from which the leonite has been separated is cooled to a temperature between about 25° C. and about 40° C., and the epsomite which crystallizes from the cooled mixture is separated, for example by filtration. The liquor from which the epsomite has been separated is recycled to the langbeinite treatment step. The epsomite is dehydrated in a rotary drier maintained at a temperature between about 150° C. and about 250° C., and kieserite is the drier product. The kieserite obtained as the drier product is decomposed at a temperature of about 1150° C. to produce magnesium oxide and sulfur trioxide from which sulfuric acid is prepared.

As a specific example of the process, the following serves as an illustration and it is not intended that the scope of the invention be limited thereto.

EXAMPLE

About 37.56 pounds of an aqueous pulp of comminuted langbeinite of substantially 100% minus 200 mesh particle size was mixed with about 165.14 pounds of magnesium sulfate solution. The resulting mixture was agitated for about 6 hours at a temperature between about 55° C. and about 61° C. The leonite crystals which formed were separated from the liquor by filtration. The resulting magnesium sulfate liquor was cooled to about 30° C., and the epsomite that crystallized from the liquor was separated by filtration. The liquor from which the epsomite was separated was recycled to the langbeinite treatment step. The composition of the process liquors and salts which were separated is shown in the following table:

Table.—Composition of materials

| Material | Wt. Percent | | |
|---|---|---|---|
| | $K_2SO_4$ | $MgSO_4$ | $H_2O$ |
| Magnesium sulfate solution | 4.23 | 29.23 | 66.45 |
| Langbeinite | 42.00 | 58.00 | |
| Leonite Cake | 41.02 | 33.13 | 25.84 |
| Leonite Mother Liquor @ 61° C | 4.29 | 34.89 | 60.82 |
| Epsomite Cake | 0.41 | 46.74 | 52.85 |

About 58% of the magnesium content of the langbeinite is present in the leonite cake and about 42% of the magnesium is recovered as magnesium sulfate heptahydrate.

Having thus fully described and illustrated the character of the instant invention what is desired to be secured and protected by Letters Patent is:

1. A process for the production of epsomite from langbeinite which comprises reacting langbeinite at a temperature below 61° C. with a material selected from the group consisting of water and aqueous solutions of magnesium sulfate, said langbeinite and said material being employed in proportions requisite to produce by said reaction a precipitate of leonite substantially uncontaminated with solid magnesium sulfate and a mother liquor in the form of a solution substantially saturated with respect to magnesium sulfate hexahydrate and containing a minor portion of dissolved potassium sulfate, separating said leonite precipitate from said mother liquor, cooling said mother liquor to a temperature below about 40° C. and above the freezing point of said liquor to precipitate substantially potassium sulfate free epsomite therefrom and recovering said epsomite.

2. The process of claim 1 wherein the liquor from which the epsomite is separated is employed as the material with which the langbeinite is reacted.

3. The process of claim 1 wherein said langbeinite is reacted with said material at a temperature of from about 50° C. to about 61° C.

4. The process of claim 3 wherein said material with which said langbeinite is reacted is an aqueous solution of magnesium sulfate.

5. The process of claim 3 wherein said material with which said langbeinite is reacted is water.

6. The process of claim 1 wherein said material with which said langbeinite is reacted is an aqueous solution of magnesium sulfate.

7. The process of claim 6 wherein said aqueous solution of magnesium sulfate is substantially saturated with respect to magnesium sulfate.

8. The process of claim 1 wherein said material with which said langbeinite is reacted is water.

9. The process of claim 1 wherein said material and said langbeinite are reacted for at least about six hours.

10. The process of claim 9 wherein said mother liquor from which said leonite is separated is cooled to a temperature of between about 20° C. and about 40° C. to precipitate said epsomite.

11. The process of claim 1 wherein said mother liquor from which said leonite is separated is cooled to a temperature of between about 20° C. and about 40° C. to precipitate said epsomite.

12. A process for the production of epsomite from langbeinite which comprises reacting langbeinite at a temperature below about 61° C. with an aqueous solution substantially saturated with respect to magnesium sulfate heptahydrate, there being employed about 100 pounds of said solution for each 20 to 24 pounds of said langbeinite, separating the precipitate of leonite formed by said reaction from the attendant mother liquor, cooling said mother liquor to a temperature between about 20° C. and about 40° C. to form a precipitate of epsomite, separating said epsomite from the liquor from which it precipitated, and employing said liquor from which said epsomite was separated as said aqueous solution with which said langbeinite is reacted.

References Cited in the file of this patent

UNITED STATES PATENTS

| 2,218,551 | Richards | Oct. 22, 1940 |
| 2,295,257 | Butt et al. | Sept. 8, 1942 |
| 2,437,182 | Barr et al. | Mar. 2, 1948 |

OTHER REFERENCES

Mellor: Comprehensive Treatise on Inorganic and Theoretical Chemistry; vol. IV; pp. 321–323; Longmans, Green and Co., 1923.

Jacobson: Encyclopedia of Chemical Reactions; vol. IV; p. 450; Equation IV—1849; Reinhold Publishing Corp., 1941.